June 19, 1951
T. R. KOMLINE
2,557,440
ROTARY DRUM VACUUM FILTER
Filed Feb. 14, 1949
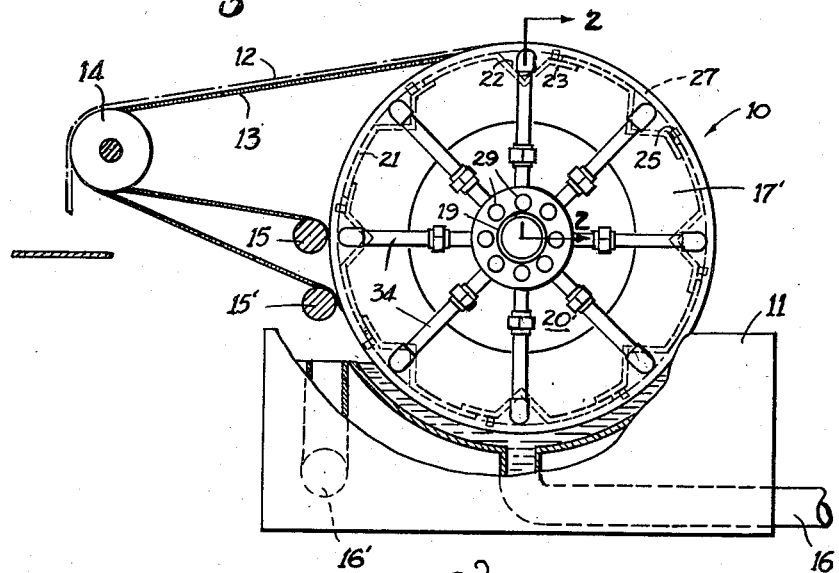
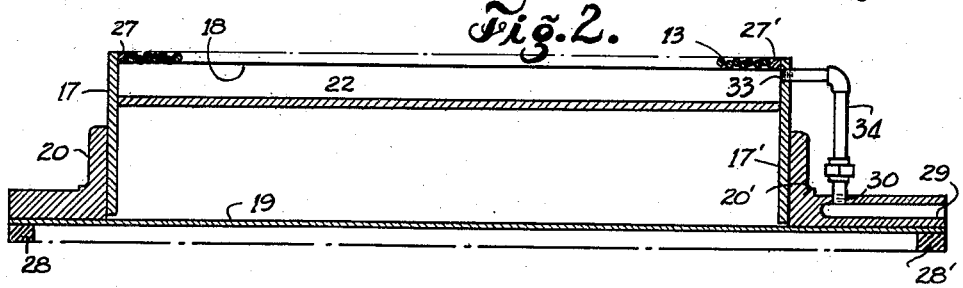
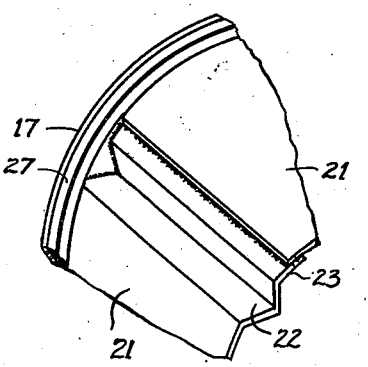
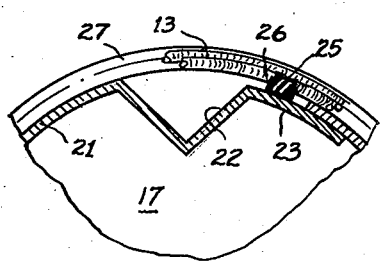
INVENTOR.
THOMAS R. KOMLINE
BY
*John F. Warden*
AGENT Patented June 19, 1951

2,557,440

UNITED STATES PATENT OFFICE 2,557,440

ROTARY DRUM VACUUM FILTER

Thomas R. Komline, Ridgewood, N. J.

Application February 14, 1949, Serial No. 76,399

2 Claims. (Cl. 210—199)

This invention relates to improvements in rotary drum vacuum filters. In particular the invention is directed to an improved drum for vacuum filters of the type employing a web of stranded filter filaments trained about the drum for separation of solids from a liquid carrier.

This application is a continuation-in-part of my earlier application, Serial Number 727,589, filed February 10, 1947, now Patent Number 2,461,824, dated February 15, 1949, for improvements in continuous rotary drum filters.

Drum filters for industrial or sewage waste treatment are relatively large mechanical equipment, the drum sizes ranging in diameter to 20' and in length from a few feet to 25 or more feet, consistent with requirements in general. Drums of this description are compartmentalized for the distribution of vacuum to prescribed segmental areas whereby cake formation, and drainage may be performed at certain locations during parts of the drum cycle and, during the balance of the cycle, the filter medium may be trained away from the drum for the discharge of solids. As large equipment of this kind requires extremely large machine tool fabricating facilities, it has been found expedient to construct filter drums in smaller sections, the sections being welded or otherwise secured to each other with appropriate drum heads and drum trunnions to form a complete filter drum.

In the form of drum filters to which my invention is adapted there need be no access to the interior of the drum from the drum surface for carrying effluent which passes through the filter medium and hence the drum surface may be continuous and imperforate. Drainage is accomplished as hereinbefore shown by creating a channel lengthwise of the drum through which liquid may pass to an outlet in one of the drum heads and thence through suitable communicating conduit to a vacuum valve and vacuum system. Segmental compartments are provided in order to maintain the vacuum in prescribed areas, and dividing strips of neoprene or other deformable material are used to define the segments and to form a seal with the web filter filaments trained about the drum. In this manner there will be no communication between adjacent compartmental areas and hence, with suitable valve device there will be no loss of vacuum when the web filter element is removed from the drum for the discharge of filter cake.

In my earlier application, above mentioned, I show and describe a filter drum of this class consisting of a series of arched segmental sections fitted between the drum heads, and between each pair of segmental sections, an angle section is assembled to form the drainage channel. Compartmental separators are disposed either on the drum surface or within the confines of the angle sections for dividing the drum into the vacuum compartments. A disadvantage of this style of drum structure resides in the difficulties encountered when the arched sections are welded to the angle pieces; the welding temperatures creating problems of expansion and contraction which make assembly a difficult task and effect the uniformity of the drum configuration.

To overcome this disadvantage I provide, in part, according to this invention, a series of formed segmental sections of irregular shape each of which includes the arched portion, the drainage channel and also a lapped surface to provide for a lapped joint at both edges, the lapped surfaces being arranged to fit together with adjacent sections and form an accurate cylindrical shape in the finished product. The lapped surface on the side of the arched member is depressed slightly below its mating surface on an adjacent arched member to accommodate the thickness of material and at the same time to provide a stepped-down supporting surface to which a compartmental divider strip may be affixed below the cylindrical drum level. The resulting drum is easy to construct and is concentric, and requires little in the way of special tooling.

Accordingly, it is the principal object of my invention to provide a readily fabricated filter drum structure which may be assembled without the need for large tool equipment. A further object of the invention is to provide a concentric filter drum having longitudinal channels and provision for compartmental division strips. Further objects and advantages of the invention will be understood by consideration of the following specification taken in conjunction with the accompanying drawing in which:

Figure 1 is a diagrammatic side elevation of a filter employing the drum of my invention, partly cut away for clarity, Figure 2 is a cross-section view taken through the drum of Figure 1 on lines 2—2, Figure 3 is a perspective view showing a portion of the assembled drum, and Figure 4 is an enlarged cross-section view showing a fragment of the drum including a sealing strip employed for compartmentalizing the drum.

The improved filter drum 10, Figure 1, may be supported for axial rotation while partly submerged in a tank 11 containing a suspension of solids in a liquid to be filtered. The direction of rotation of the drum is counter-clockwise so that the accumulated filter cake 12 which is drawn to the drum and rests on filter element 13 may be carried thereby and discharged as element 13 reverses direction over a discharge roller 14. Filter element 13 which is composed of a layer of parallel strands of filter filaments then separates, and returns to the drum over guide rollers 15, 15'. An intake pipe line 16 directs liquid to tank 11 and an overflow line 16' is provided for handling excess. Drum filters of this description are well known in the art and need not be further elaborated upon here.

Referring to Figures 2 and 3, drum 10 includes a pair of companion metal drum heads or discs 17, 17' between which is a generally cylindrical, grooved barrel portion 18. Axially of the drum heads 17, 17', and disposed continuously through the drum is a hollow tubular drum trunnion 19 which extends for a sufficient distance out beyond each drum head to provide for axial support of the drum during rotation. Drum heads 17, 17' may be constructed from heavy boiler plate with clearance holes in their axial centers in order that they may be concentrically mounted on the trunnion as by the use of bearing flanges 20, 20'.

The drum barrel 18, see Figures 3 and 4, forming the central drum portion is constructed from a series of overlapping segmental sections 21 corresponding in curvature with the diameter of the drum, one side of each section having formed therein a trough 22 and an extending ledge 23. While I have shown trough 22 to be of V configuration, this portion of the segment 21 may be any desired shape of trough or channel such as a curved section or square section, an important feature being to provide for the passage of filtration effluent longitudinally of the drum and for communication with a source of vacuum. Channel 22 also forms a stiffening rib to minimize deformation during the welding process as will be understood at a later point in the description of fabrication. Ledge 23 is located below the radius of curvature of the section and is shaped to permit the mating edge of adjacent section 21 to rest thereon for assembly welding. Moreover, ledge section 23 is sufficiently wide for the application of a compartmental sealing strip 25 adjacent the side of trough 22 whereby it may be supported on a strip bracket 26 below the outside drum diameter, thus permitting the filter web 13 to rest thereon and be sealed thereagainst without any unnecessary arching of the web above the drum surface. This feature is particularly advantageous in the case of a web constructed of contiguous parallel filaments which, if unduly arched at a sealing strip, may tend to separate from each other and permit undesired passage of effluent with solids therebetween. Secured at each of the drum ends, affixed to the drum heads 17, 17', is an annular ring 27 of smooth material against which the filter web rests, providing end-sealing against the passage of effluent and also providing a trim, and guide for welding fabrication.

Within the ends of trunnion 19, Figure 2, are closure plugs 28, 28' which finish off the ends of the trunnion. Bearing flange 20' on the right hand end is provided axially of the drum with a series of concentric horizontal cored openings 29 for communication with a vacuum valve mechanism, not shown, and, for each horizontal opening, a tapped radial aperture 30 aligns therewith permitting the installation of pipe nipples therein. Tapped openings 33 are likewise provided in drum head 17' at the location of channels 22, and suitable piping 34 is installed between the openings 30 and 33 so that effluent may pass from the channel 23 outwardly of the trunnion during filtration procedure.

As shown in Figure 4, the sealing strips 25 of sponge rubber or the like are disposed in holding strips 26 on ledge 23 and they may be radially positioned as by inserting shims underneath the bracket 26. As the sealing strips become worn or deformed by the continuous effects of filter operation, they may be raised slightly to improve the vacuum seal and to more effectively hermetically segregate the compartment areas. In operation, web 13 is carried by the drum in contact with the drum heads during the vacuum cycle and thus seals the ends of the compartments and, by reason of the complete closure which is effected at the joints of the web and drumheads and by the sealing strips there is no passage by which effluent may be removed from the individual compartments other than through the nipples and associated piping hereinbefore described.

In fabricating a filter drum in accordance with my present invention, I prefer to employ stainless clad plate material, the separate sections being welded with stainless welding rod. Following the operation of roughly cutting-out the drum heads, as by torch procedure, the stainless steel trim strips 27 are tacked on, care being taken to ensure its accuracy of radius. Shaft 19 is then placed in position through suitable clearance holes in the heads and bearing flanges 20 and 20' are installed thereover, after which the flanges may be secured to the heads either by welding or bolting with appropriate machine bolts. Using the trim strip as a guide, the preformed sections may then be placed in position, one at a time, and secured to the drum and to each other by welding. The various additional equipment such as separator brackets, piping, and other material may subsequently be attached in the usual manner.

The importance of the invention resides in the drum construction and those skilled in the art will appreciate the simplicity with which a large filter drum may be constructed according to the principles of my invention. It will be understood that various changes may be made in the construction and shape of the drum and, likewise, that alternatives in drum shape may be employed, and that other substitutions may be resorted to without departing from the invention as particularly pointed out in the sub-joined claims.

I claim:

1. In a drum for a continuous rotary vacuum filter of the class described, in combination, a pair of spaced drum heads and a barrel portion situated between the drum heads in axial alignment therewith, said barrel portion being an imperforate substantially cylindrical shell having convex peripheral surfaces for supporting a permeable filter medium and drainage channels longitudinally of the drum axis adjacent said convex portions over which a filter medium bridges, said shell being constructed from a series of lapped segmental portions each having a drainage channel located intermediate of a peripheral area and a sub-peripheral lapping edge and integral therewith.

2. In a drum for a continuous rotary vacuum filter of the class described, in combination, a pair of spaced drum heads and a barrel portion situated between the drum heads in axial alignment therewith, said barrel portion being an imperforate substantially cylindrical shell having convex peripheral surfaces for supporting a permeable filter medium and drainage channels longitudinally of the drum axis adjacent said convex portions over which a filter medium bridges, said shell being constructed from a series of lapped segmental portions each having a drainage channel located intermediate of a peripheral area and a sub-peripheral lapping edge and integral therewith, and compartmental divider strips affixed to said sub-peripheral lapping edge.

THOMAS R. KOMLINE.

REFERENCES CITED

The following references are of record in the file of this patent:

UNITED STATES PATENTS

| Number | Name | Date |
|---|---|---|
| 2,461,824 | Komline | Feb. 15, 1949 |